(12) United States Patent
Ding et al.

(10) Patent No.: US 12,398,777 B2
(45) Date of Patent: Aug. 26, 2025

(54) HYDRAULIC COMPOSITE BUSHING, FLOW CHANNEL FOR SAME, AND METHOD FOR FORMING FLOW CHANNEL

(71) Applicant: ZHUZHOU TIMES NEW MATERIAL TECHNOLOGY CO., LTD, Hunan (CN)

(72) Inventors: Xingwu Ding, Hunan (CN); Jiling Bu, Hunan (CN); Haitao Cheng, Hunan (CN); Bo Zou, Hunan (CN); Zhangyang Xia, Hunan (CN); Jicao Zou, Hunan (CN)

(73) Assignee: ZHUZHOU TIMES NEW MATERIAL TECHNOLOGY CO., LTD, Hunan (CN)

( * ) Notice: Subject to any disclaimer, the term of this patent is extended or adjusted under 35 U.S.C. 154(b) by 372 days.

(21) Appl. No.: 17/922,721

(22) PCT Filed: Sep. 30, 2020

(86) PCT No.: PCT/CN2020/119489
§ 371 (c)(1),
(2) Date: Nov. 1, 2022

(87) PCT Pub. No.: WO2021/238009
PCT Pub. Date: Dec. 2, 2021

(65) Prior Publication Data
US 2023/0167876 A1     Jun. 1, 2023

(30) Foreign Application Priority Data
May 27, 2020   (CN) .......................... 202010459519.1

(51) Int. Cl.
*F16F 13/10*     (2006.01)
*F16F 13/14*     (2006.01)

(52) U.S. Cl.
CPC .......... *F16F 13/1463* (2013.01); *F16F 13/10* (2013.01); *F16F 13/14* (2013.01)

(58) Field of Classification Search
CPC .... F16F 13/14; F16F 13/1454; F16F 13/1463; F16F 2226/045; F16F 2230/06
See application file for complete search history.

(56) References Cited

U.S. PATENT DOCUMENTS 4,840,359 A * 6/1989 Hamaekers ............. F16F 13/14
 267/153
4,896,868 A * 1/1990 Thelamon ........... F16F 13/1427
 267/219

(Continued)

FOREIGN PATENT DOCUMENTS

CN     102465990 A     5/2012
CN     106438827 A *   2/2017

(Continued)

OTHER PUBLICATIONS

Extended European Search Report from corresponding EP Application No. 20937798.5, Jun. 7, 2024.

(Continued)

*Primary Examiner* — Thomas J Williams
(74) *Attorney, Agent, or Firm* — Workman Nydegger

(57) ABSTRACT

A hydraulic composite bushing, a flow channel for same, and a method for forming the flow channel, wherein the hydraulic composite bushing includes: a core shaft; a rubber member, arranged on an outer peripheral surface of the core shaft and provided with two recesses diametrically opposite to each other; two support rings arranged around the rubber member; and an outer casing press-fitted on the support rings from a radially outer side thereof through interference (Continued)

fit. The outer casing covers the recesses to form two hydraulic chambers for accommodating hydraulic fluid between the rubber member and the outer casing, and the support ring is provided with a flow channel for the hydraulic fluid, so that two hydraulic chambers are in communication with each other via the flow channel. A sealing device is provided at a connection between the outer casing and each of the recesses to seal each hydraulic chamber.

11 Claims, 4 Drawing Sheets

(56) References Cited

U.S. PATENT DOCUMENTS

| | | | | |
|---|---|---|---|---|
| 5,013,012 | A | * | 5/1991 | Jouade ............... F16F 13/1463 180/312 |
| 5,080,331 | A | * | 1/1992 | de Fontenay ........... F16F 13/14 180/312 |
| 5,139,241 | A | | 8/1992 | Hamaekers et al. |
| 5,199,691 | A | * | 4/1993 | Bouhier ................. F16F 13/14 267/140.12 |
| 5,769,380 | A | | 6/1998 | Hibi et al. |
| 7,219,882 | B2 | | 5/2007 | Kato |
| 8,038,132 | B2 | | 10/2011 | Thornhill et al. |
| 2023/0167876 | A1 | * | 6/2023 | Ding ....................... F16F 13/14 267/140.11 |

FOREIGN PATENT DOCUMENTS

| | | | | |
|---|---|---|---|---|
| CN | 108150591 | A | 6/2018 | |
| CN | 109236939 | A | 1/2019 | |
| CN | 109268436 | A | 1/2019 | |
| CN | 20929432 | U | 8/2019 | |
| CN | 209294324 | U | 8/2019 | |
| CN | 110454537 | A | 11/2019 | |
| CN | 111706639 | A | 9/2020 | |
| DE | 102013204995 | A1 | * 9/2014 | ............ F16C 27/063 |
| GB | 2381846 | A | 5/2003 | |
| JP | H07293630 | A | 11/1995 | |
| JP | 2008240955 | A | 10/2008 | |

OTHER PUBLICATIONS

Chinese Office Action and Search Report from corresponding Chinese Application No. 202010459519.1, Feb. 23, 2021.
International Search Report from corresponding PCT Application No. PCT/CN2020/119489, Feb. 25, 2021.

* cited by examiner

HYDRAULIC COMPOSITE BUSHING, FLOW CHANNEL FOR SAME, AND METHOD FOR FORMING FLOW CHANNEL

CROSS REFERENCE OF RELATED APPLICATION

The present application claims the priority of Chinese patent application No. 202010459519.1, entitled "Hydraulic composite bushing, flow channel for same and method for forming flow channel" and filed on May 27, 2020, the entire content of which is incorporated herein by reference.

FIELD OF THE INVENTION

The present invention relates to a hydraulic composite bushing for vehicles, in particular rail vehicles. The invention also relates to a flow channel for the hydraulic composite bushing, and a method for forming the flow channel.

BACKGROUND OF THE INVENTION

Hydraulic bushing is a component widely used in vehicles (such as, automobiles and rail vehicles), and mainly installed on a suspension or a bogie of a vehicle for absorbing vibrations and shocks to improve the running stability and safety of vehicles. The hydraulic bushing usually includes a core shaft, a rubber member, and an outer casing arranged around the core shaft. Two hydraulic chambers filled with hydraulic fluid are provided inside the rubber member, and connected with each other through a flow channel. When the vehicle is running on a special section of a road, the wheels will drive the core shaft to move relative to the outer casing, causing the hydraulic chambers to expand and contract accordingly, so that the hydraulic fluid is able to flow between said two hydraulic chambers. In this manner, the stiffness of the hydraulic bushing can be adjusted, so that the vehicle can keep running stably.

In practical applications, when the hydraulic fluid flows through the flow channel, it is easy to flow out from a contact gap between the flow channel and other components. Accordingly, the hydraulic fluid will move laterally in the flow channel, thus seriously affecting the working performance of the hydraulic bushing. Therefore, sealing requirements for the flow channel connecting two hydraulic chambers are very high.

In current hydraulic bushings, the flow channel is usually arranged on the surface of the core shaft or of the support ring, and the flow channel is sealed through being directly pressed by the rubber member or the outer casing. In operation, however, the hydraulic bushing is subjected to load and vibration, so that the volume of the hydraulic chamber is constantly changing. In addition, the pressure of the hydraulic fluid in the hydraulic chamber is very high, which would readily lead to a surge in liquid pressure. In view of this, current methods for sealing the flow channel cannot meet the sealing requirements, resulting in lateral leakage of the fluid in the flow channel, which seriously affects the sealing performance of the hydraulic bushing so that effective sealing cannot be achieved. Therefore, the stiffness adjustment and service life of the hydraulic bushing are significantly affected.

SUMMARY OF THE INVENTION

In view of the above technical problems, the present invention aims to provide a hydraulic composite bushing, which can effectively improve the overall sealing effect of the hydraulic chambers, thus enhancing the performance of stiffness adjustment of the hydraulic composite bushing.

The present invention further provides a flow channel for the hydraulic composite bushing, and a method for forming the flow channel. The flow channel can effectively enhance the sealing performance and withstand fluid pressure. The method for forming the flow channel can effectively ensure the sealing performance of the flow channel, and further improve the performance of stiffness adjustment of the hydraulic composite bushing.

For this purpose, the present invention proposes a hydraulic composite bushing, comprising: a core shaft; a rubber member, arranged on an outer peripheral surface of the core shaft and provided with two recesses diametrically opposite to each other; two support rings arranged around the rubber member and spaced apart from each other; and an outer casing press-fitted on the support rings from a radially outer side thereof through interference fit. The outer casing covers the recesses to form two hydraulic chambers for accommodating hydraulic fluid between the rubber member and the outer casing, and the support ring is provided with a flow channel for the hydraulic fluid, so that said two hydraulic chambers are in communication with each other via the flow channel. A sealing device is provided at a connection between the outer casing and each of the recesses to seal each hydraulic chamber.

In one embodiment, the sealing device comprises a first sealing element and a second sealing element. The first sealing element is arranged around an outer peripheral surface of the support ring, and the second sealing element is fitted with the first sealing element so that the sealing device seals the recesses to form the hydraulic chambers.

In one embodiment, the first sealing element is formed with the rubber member and the support rings into one piece through vulcanization, and a first rubber layer is arranged between engaging surfaces of the first and second sealing elements.

In one embodiment, the first sealing element is configured to have a cylindrical shape, and two stepped holes are symmetrically arranged on a side wall of the first sealing element for receiving the second sealing element therein, the first rubber layer being arranged on a stepped face of each of the stepped holes.

In one embodiment, the core shaft is configured as a stepped shaft with a central projection portion, and the rubber member is formed on the outer peripheral surface of the core shaft by vulcanization of rubber. A diameter of the central projection portion is initially decreased and then increased along a direction from each axial end to its middle region of the central projection portion, and the rubber member is formed on an outer peripheral surface of the central projection portion in a manner of conforming to an outer peripheral contour of the central projection portion.

In one embodiment, an inner wall of each support ring is configured to conform to the outer peripheral contour of the central projection portion.

In one embodiment, a first through hole and a second through hole are respectively formed in a side wall region of the outer casing and that of the second sealing element corresponding to the hydraulic chambers. The first through hole is in communication with the second through hole to form a liquid injection port in communication with the hydraulic chamber, for injecting the hydraulic fluid into the hydraulic chamber.

In one embodiment, the liquid injection port is sealed with a high pressure ball plug.

The present invention further proposes a flow channel for a hydraulic composite bushing as mentioned above. The flow channel is arranged in one of said two support rings, and comprises a first sub flow channel and two second sub flow channels connected to both ends of the first sub flow channel respectively. The first sub flow channel is formed in an outer surface of said one of the support rings and extends in the circumferential direction, and the two second sub flow channels are formed inside said one of the support rings and in communication with respective hydraulic chambers in the rubber member, so that two hydraulic chambers are in communication with each other through the flow channel.

In one embodiment, each of the second sub flow channels comprises a first part extending in an axial direction, and a second part communicating with the first part and extending in a radial direction, the first part communicating with a corresponding hydraulic chamber, and the second part communicating with the first sub flow channel.

In one embodiment, a sealing gasket is provided on an outer side of the first sub flow channel, and a second rubber layer is vulcanized on an inner side of the sealing gasket, so that a seal is formed between the first sub flow channel and the outer casing by the sealing gasket.

The present invention also proposes a method for forming a flow channel as mentioned above, comprising steps of: forming the first sub flow channel in the outer peripheral surface of one of the support rings through grooving, wherein the first sub flow channel extends along the circumferential direction so that two ends thereof correspond to respective hydraulic chambers in the circumferential direction; forming the second sub flow channel in the support ring; vulcanizing said support ring and the rubber member into one piece, and mounting the sealing gasket on an outer side of the first sub flow channel; and press-fitting the outer casing on said support ring from a radially outer side thereof through interference fit, so that the sealing gasket forms a press-fit seal on the first sub flow channel to form the flow channel in said support ring.

Compared with the prior arts, the present invention has the following advantages.

The hydraulic composite bushing according to the present invention can effectively enhance the overall sealing effect of the hydraulic chambers, and significantly improve the performance of stiffness adjustment of the hydraulic composite bushing. The hydraulic composite bushing effectively ensures the sealing effect between the second sealing element and the rubber member, effectively enhance the sealing performance and the performance of stiffness adjustment of the hydraulic composite bushing, thus preventing lateral leakage of the hydraulic fluid in the flow channel. In the meantime, the pressure of the hydraulic fluid can be withstood, thus remarkably improving the sealing performance of the hydraulic composite bushing. The flow channel for the hydraulic composite bushing according to the present invention can realize an effective seal on the flow channel through the sealing gasket, thus effectively improving the sealing performance, withstanding the pressure of the hydraulic fluid, and further enhancing the sealing performance of the hydraulic composite bushing. Thus, the performance of stiffness adjustment of the hydraulic composite bushing is further improved, which is very beneficial to improve the fatigue performance of the product. The method for forming the flow channel of the present invention is simple in operation, and can significantly improve the sealing performance of the flow channel, further enhancing the overall sealing performance of the hydraulic composite bushing and the performance of stiffness adjustment of the hydraulic composite bushing. Moreover, the hydraulic composite bushing and the flow channel have simple structures with outstanding sealing effect, and can effectively withstand the pressure of hydraulic fluid, thereby effectively prolonging the service life of the hydraulic composite bushing and the flow channel.

BRIEF DESCRIPTION OF THE DRAWINGS

The present invention will be explained with reference to accompanying drawings, in which.

In this application, all drawings are schematic ones used to illustrate the principle of the present invention only, and are not drawn to actual scale.

DETAILED DESCRIPTION OF THE EMBODIMENTS

The present invention will be described below with reference to the accompanying drawings.

Figure 2:
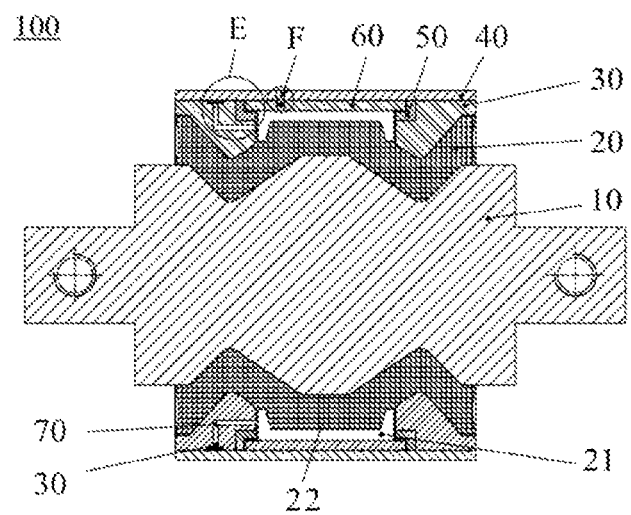
FIG. 2 is a cross-sectional view taken along line B-B in FIG. 1.

It should note that the terms "axial" and "radial" in the context refer to the horizontal direction and the vertical direction in FIG. 2, respectively, and the radial direction associated with a part of the hydraulic composite bushing 100 with the hydraulic chambers therein is defined as the hollow radial direction, while the radial direction associated with a part thereof without the hydraulic chambers is defined as the solid radial direction.

Figure 1:
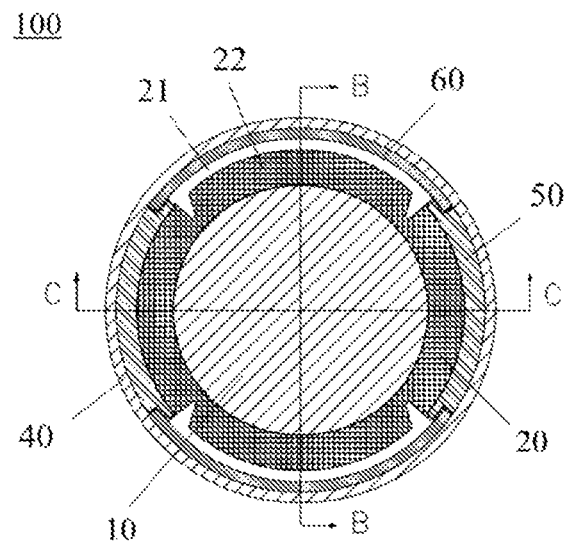
FIG. 1 is an axial cross-sectional view of a hydraulic composite bushing according to the present invention.

FIG. 1 is an axial cross-sectional view of a hydraulic composite bushing 100 according to the present invention. As shown in FIG. 1, the hydraulic composite bushing 100 includes a core shaft 10, a rubber member 20 disposed on an outer peripheral surface of the core shaft 10, two support rings 30 arranged on the rubber member 20 at a radially outer side thereof and axially spaced from each other, and an outer casing 40 pressed on the support rings 30 from an radially outer side thereof through interference fit. The core shaft 10 is usually a pre-formed member, and both ends of the core shaft 10 can be connected to, for example, a bogie frame of a rail vehicle. The rubber member 20 is formed on the outer peripheral surface of the core shaft 10 by vulcanization of rubber, and the core shaft 10 and the support rings 30 are integrally formed by vulcanization also. In this manner, the overall performance of the hydraulic composite bushing 100 is greatly enhanced.

Figure 3:
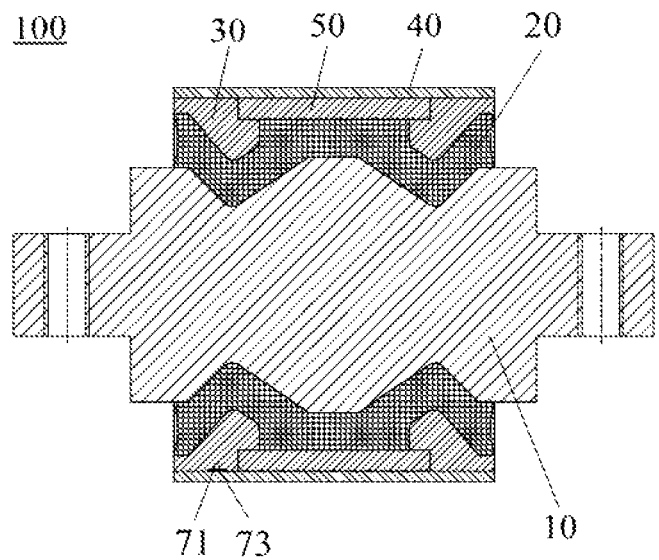
FIG. 3 is a cross-sectional view taken along line C-C in FIG. 1.

According to the present invention, the core shaft 10 is configured as a stepped shaft with a central projecting portion. As shown in FIGS. 2 and 3, the central projecting portion of the core shaft 10 has a diameter which is initially gradually reduced and then gradually increased along a direction from each axial end of the central projecting portion to its middle region, but the middle region has an unchanged diameter. The rubber member 20 is vulcanized on an outer peripheral surface of the central projecting portion in a manner of conforming to the outer contour of the central projecting portion, so that the rubber member 20 also has a diameter which is initially gradually reduced and then gradually increased along a direction from each axial end of the rubber member to its middle region, but the middle region of the rubber member 20 has an unchanged diameter.

As shown in FIGS. 1 and 2, the rubber member 20 is provided with two recesses diametrically opposite to each other. Said two recesses are arranged at a radially outer side of the middle region of the central projecting portion, and configured to extend over a part of the circumferential direction and the axial direction. Two support rings 30 spaced from each other is arranged around the rubber member 20, and located at both axial ends of the recesses respectively. Axial outer ends of the support rings 30 are flush with the axial end faces of the rubber member 20, respectively. The outer casing 40 presses on the support rings 30 from a radially outer side thereof through interference fit, and covers the recesses to form two hydraulic chambers 21 between the outer casing 40 and the rubber member 20, for accommodating hydraulic fluid. Accordingly, said two hydraulic chambers 21 are arranged diametrically opposite to each other. That is, said two hydraulic chambers 21 extend over a part of the circumferential direction, and are located in an axial middle region of the rubber member 20.

In the present embodiment, a radial protrusion 22 extending radially outward is provided in the middle of each recess, and has a maximum outer diameter smaller than the maximum outer diameter of the rubber member 20. In addition, each hydraulic chamber 21 has a radial thickness in a central region along each of the circumferential direction and the axial direction which is smaller than that in each of two side regions along each of the circumferential direction and the axial direction. The radial protrusion 21 can restrict the scope of relative movement between the outer casing 40 and the core shaft 10, so as to achieve secondary stiffness.

In practical applications, when the rail vehicle is under some special working conditions, the movement of the wheels will drive the core shaft 10 and the outer casing 50 to move relative to each other, so that the hydraulic chamber 40 in the front and the hydraulic chamber 40 in the rear will experience expansion and contraction, respectively. In this way, the hydraulic fluid can flow between the two hydraulic chambers 40, so that the stiffness of the hydraulic composite bushing 100 can be adjusted accordingly. As a result, the rail vehicle can keep running stably. This varying stiffness is an important property of the hydraulic composite bushing 100. These features and functions of the hydraulic composite bushing 100 are known in the art, which can be known, for example, from CN108150536A of the same applicant, which is incorporated herein by reference.

According to the present invention, a sealing device is provided at a connection between the outer casing 40 and each recess, thus forming a seal for the hydraulic chamber 21. The support ring 30 is formed with a flow channel 70 for the hydraulic fluid, so that two hydraulic chambers 21 are in communication with each other through the flow channel 70. In this manner, the hydraulic composite bushing 100 can realize stiffness adjustments in the radial hollow direction, the radial real direction and the axial direction, thus significantly enhancing the performance of stiffness adjustment of the hydraulic composite bushing 100.

Figure 4:
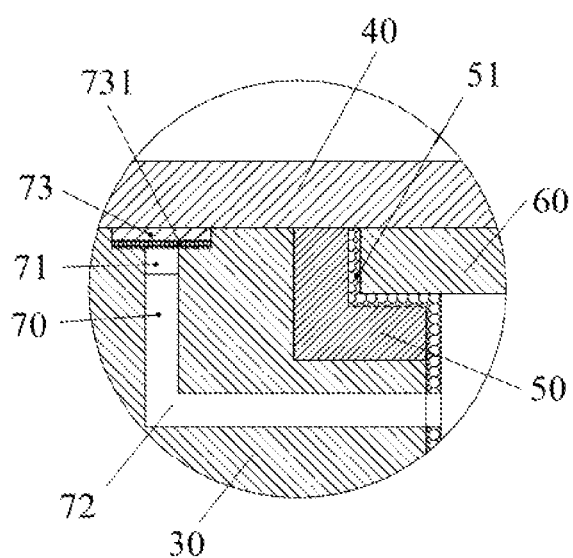
FIG. 4 is an enlarged view of area E in FIG. 2.

As shown in FIGS. 2 to 4, the sealing device includes a first sealing element 50 and a second sealing element 60 fitted therewith. The first sealing element 50 is suitably arranged on the outer peripheral surface of the support ring 30, and the second sealing element 60 is sealingly fitted with the first sealing element 50, so that the recess is sealed by the sealing device. Accordingly, the hydraulic chamber 21 is formed between the second sealing element 60 and the recess along the radial direction.

Figure 5:
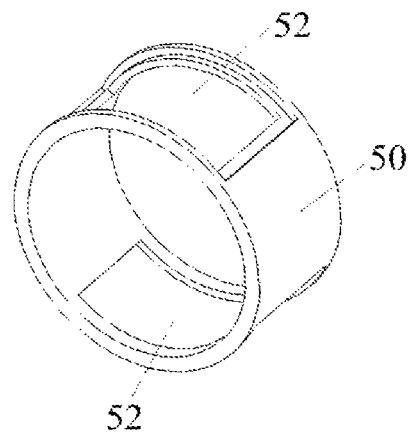
FIG. 5 shows the structure of a first sealing element.
Figure 6:
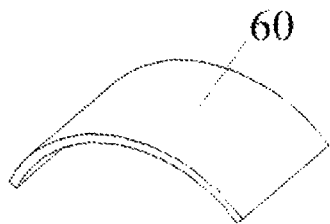
FIG. 6 shows the structure of a second sealing element.

FIGS. 5 and 6 show the three-dimensional structures of the first sealing element 50 and the second sealing element 60, respectively. As shown in FIG. 5, the first sealing element 50 is configured to have a cylindrical shape. Two stepped holes 52 corresponding to the recesses of the rubber member 20 respectively are symmetrically provided on a side wall of the first sealing element 50, for receiving the second sealing element 60 therein. The second sealing element 60 is configured as an arc-shaped plate, which can be suitably inserted into the stepped hole 52 to form a cylindrical structure together with the first sealing element 50. The first sealing element 50 is vulcanized with the rubber body 20 into one piece, and a first rubber layer 51 is provided on a stepped face of each stepped hole 52 of the first sealing element 50, so that an effective seal can be formed between engaging surfaces of the first sealing element 50 and the second sealing element 60. The sealing device is pressed by the outer casing 40, so that an outer peripheral surface of the second sealing element 60 is flush with that of the first sealing element 50. The hydraulic chamber 21 can be effectively sealed by the sealing device, which greatly improves the sealing performance of hydraulic chamber 21, thus significantly enhancing the performance of stiffness adjustment of the hydraulic composite bushing 100.

According to the present invention, the support ring 30 is configured to have a substantially cylindrical shape. The diameter of the support ring 30 is initially reduced and then increased in a direction from the axial outer end to the axial inner end of the support ring 30, so that an inner sidewall surface of the support ring 30 can conform to the outer contour of the rubber member 20. Such a structure of the support ring 30 is particularly beneficial to enhance the press fit effect on the rubber body 20, and is also beneficial to enhance the sealing performance of the hydraulic chambers. The support rings 30 are arranged around the rubber body 20, and located on axial sides of the recesses, respectively. The support ring 30 is provided with a mounting step at its axial inner end face, for mounting the sealing device therein. Each axial end of the first sealing element 50 of the sealing device is suitably arranged on the mounting step of the support ring 30, and the rubber member 20 extends to the axial inner end faces of the support ring 30 and the first sealing element 50 through vulcanization. As a result, the hydraulic chamber 21 can be effectively sealed, and the mounting stability of the sealing device can be effectively ensured, thus further enhancing the performance of stiffness adjustment of the hydraulic composite bushing 100.

Figure 7:
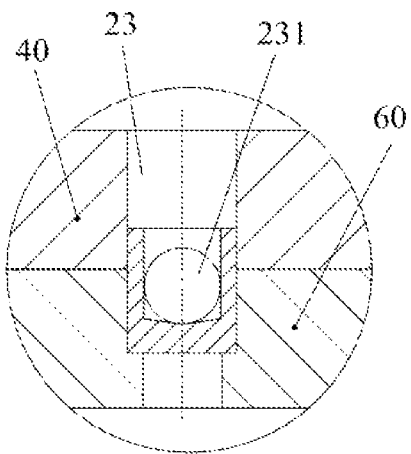
FIG. 7 is an enlarged view of area F in FIG. 2.

As shown in FIG. 7, a first through hole and a second through hole are respectively formed in a side wall of the outer casing 50 and that of the second sealing element 60 corresponding to the hydraulic chamber 21. The first through hole is in communication with the second through hole, thus forming a liquid injection port 23 that is in communication with the hydraulic chamber 21. The liquid injection port 23 is used to inject the hydraulic fluid into the hydraulic chamber 21. The liquid injection port 23 is sealed with a high pressure ball plug 231. In practical operations, the liquid injection port 23 can be opened to replenish the hydraulic fluid into the hydraulic chamber 21. After that, the liquid injection port 23 can be effectively blocked by the high pressure ball plug 231, thereby closing the liquid injection port 23. The high pressure ball plug 231 can effectively seal the liquid injection port 23, which is very beneficial to improve the sealing reliability of the hydraulic chamber 21.

Figure 8:
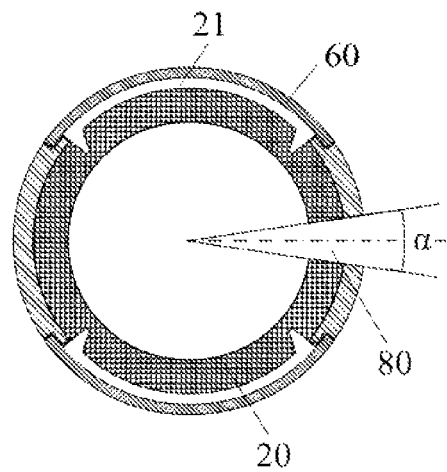
FIG. 8 shows the structure of a rubber member, the first sealing element and the second sealing element in one example.

In one embodiment, the rubber member 20 and the sealing device of the hydraulic composite bushing 100 may be provided with an opening 80, dependent on the thickness of the support ring 30. As shown in FIG. 8, an opening angle α of the opening 80 can be set according to the amount of interference between the outer casing 40 and the sealing device and that between the support ring 30 and the sealing device, e.g., in a range of 6°-10°. The structure of the opening 80 can further enhance the performance of stiffness adjustment of the hydraulic composite bushing 100 in the circumferential direction and the radial direction, so as to further improve the fatigue performance of the product.

According to the present invention, the flow channel 70 is provided in the support ring 30. As shown in FIG. 4, the flow channel 70 comprises a first sub flow channel 71 and a second sub flow channel 72 connected to each end of the first sub flow channel 71. The first sub flow channel 71 is formed in the outer surface of the support ring 30, and extends along the circumferential direction to an extent so that both ends thereof respectively correspond to the hydraulic chambers 21 in the circumferential direction. The first sub flow channel 71 is formed as a groove, which has a mounting part at an opening of the groove, for receiving a sealing gasket 73 (described below). Two second sub flow channels 72 are formed inside the support ring 30, and communicate with respective hydraulic chambers 21 in the rubber member 20, so that the two hydraulic chambers 21 can be in communication with each other through the flow channel 70. One of the two support rings 30 of the hydraulic composite bushing is provided with such a flow channel 70.

As shown in FIG. 4, the second sub flow channel 72 comprises a first part extending in the axial direction, and a second part communicating with the first part and extending in the radial direction. The first part is in communication with a corresponding hydraulic chamber 21, while the second part is in communication with the first sub channel 71. In this manner, the two hydraulic chambers 21 in the rubber member 20 are in communication with each other through the flow channel 70, so that stiffness adjustments in the radial hollow direction, the radial real direction and the axial direction can be achieved.

Figure 9:
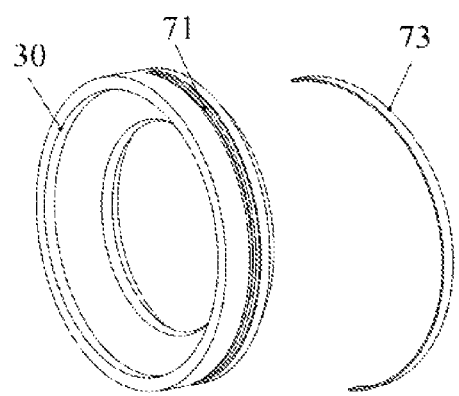
FIG. 9 schematically shows the structures of the support ring with the flow channel and a sealing gasket, in a state before being assembled together.

According to the present invention, a sealing gasket 73 is suitably mounted in the mounting part of the first sub flow channel 71, and has an inner side vulcanized with a second rubber layer 731. When the gasket 73 is mounted, the second rubber layer 731 is located between engaging surfaces of the gasket 73 and the mounting part. The sealing gasket 73 can effectively seal the first sub flow channel 71 under the pressing action of the outer casing 40, so that an effective sealing can be formed between the outer casing 40 and the flow channel 70 through the sealing gasket 73. This structure of the flow channel 70 can, in particular, enhance the sealing performance of the flow channel 70 and the hydraulic chamber 21 significantly, thereby greatly improving the performance of stiffness adjustment of the hydraulic composite bushing 100, which is very beneficial to improve the fatigue performance of the product. FIG. 9 schematically shows the structures of the support ring with the flow channel and the sealing gasket, in a state before being assembled together.

In the following a method for forming the flow channel 70 for the hydraulic composite bush 100 according to the present invention will be described. First, the first sub flow channel 71 is formed in the outer peripheral surface of one of the support rings 30 through grooving, wherein the first sub flow channel 71 extends along the circumferential direction to the extent that both ends thereof respectively correspond to the hydraulic chambers 21 in the circumferential direction. Then, the second sub flow channels 72 are formed inside the support ring 30, wherein the second part of each second sub flow channel 72 is formed radially inner of the support ring 30 at each end of the first sub flow channel 71, and extends radially inward in a manner of corresponding to the corresponding hydraulic chamber 21 in the radial direction. The first part of each second sub flow channel 72 is formed in the support ring 30 along the axial direction, until it extends to the axial inner end face of the support ring 30. Both ends of the first part are in communication with the second part and the hydraulic chamber 21, respectively. After that, the support ring 30 and the rubber member 20 are vulcanized into one piece. Subsequently, the second rubber layer 731 is vulcanized on the inner wall surface of the sealing gasket 73, which is then suitably mounted in the mounting part of the first sub flow channel 71, so that a seal is formed between the sealing gasket 73 and the mounting part. After that, the outer casing 40 is press-fitted on the support ring 30 from a radially outer side thereof through interference fit, so as to press the sealing gasket 73 in the mounting part, thus forming a press-fit seal on the first sub flow channel 71 through the sealing gasket 73. Therefore, the flow channel 70 is formed inside the support ring 30.

The hydraulic composite bushing 100 according to the present invention can effectively enhance the overall sealing effect of the hydraulic chambers, and significantly improve the performance of stiffness adjustment of the hydraulic composite bushing 100. The hydraulic composite bushing 100 effectively ensures the sealing performance of the hydraulic chambers 21 through the sealing device, prevents the hydraulic fluid from flowing into the gaps between engaging surfaces of the sealing device, and avoids lateral leakage of the hydraulic fluid in the flow channel 70. In the meantime, the pressure of the hydraulic fluid can be withstood, thus greatly improving the sealing performance of the hydraulic composite bushing 100. The flow channel 70 for the hydraulic composite bushing according to the present invention can realize an effective seal on the flow channel 70 through the sealing gasket 73, thus effectively improving the sealing performance, withstanding the pressure of the hydraulic fluid, and further enhancing the sealing performance of the hydraulic composite bushing 100. Thus, the performance of stiffness adjustment of the hydraulic composite bushing 100 is further improved, which is very beneficial to improve the fatigue performance of the product. The method for forming the flow channel 70 of the present invention is simple in operation, and can significantly improve the sealing performance of the flow channel 70, further enhancing the overall sealing performance of the hydraulic composite bushing 100 and the performance of stiffness adjustment of the hydraulic composite bushing 100. Moreover, the hydraulic composite bushing 100 and the flow channel 70 have simple structures with outstanding sealing effect, and can effectively withstand the pressure of hydraulic fluid, thereby effectively prolonging the service life of the hydraulic composite bushing 100 and the flow channel 70.

Finally, it should note that the foregoing introduces preferred embodiments of the present invention merely, and does not constitute any limitations to the present invention. Although the present invention has been described in detail with reference to the above embodiments, for those skilled in the art, the technical solutions recited in the above embodiments can still be modified, or some technical features thereof can be equivalently replaced. Any modifications, equivalent replacements, improvements or the like made within the spirit and principle of the present invention shall be included within the scope of protection scope of the present invention.

The invention claimed is:

1. A hydraulic composite bushing, comprising:
a core shaft;
a rubber member, arranged on an outer peripheral surface of the core shaft and provided with two recesses diametrically opposite to each other;
two support rings arranged around the rubber member and spaced apart from each other; and
an outer casing press-fitted on the support rings from a radially outer side thereof through interference fit,
wherein the outer casing covers the recesses to form two hydraulic chambers for accommodating hydraulic fluid between the rubber member and the outer casing, and at least one of the support rings is provided with a flow channel for the hydraulic fluid, so that said two hydraulic chambers are in communication with each other via the flow channel;
a sealing device is provided at a connection between the outer casing and each of the recesses to seal each hydraulic chamber;
wherein the flow channel comprises a first sub flow channel and two second sub flow channels connected to both ends of the first sub flow channel respectively, wherein the first sub flow channel is formed in an outer peripheral surface of said at least one of the support rings and extends in the circumferential direction, and the two second sub flow channels are formed inside said one of the support rings and in communication with respective hydraulic chambers in the rubber member; and
a sealing gasket is provided on an outer side of the first sub flow channel, and a second rubber layer is vulcanized on an inner side of the sealing gasket, so that a seal is formed between the first sub flow channel and the outer casing by the sealing gasket.

2. The hydraulic composite bushing according to claim 1, wherein the sealing device comprises a first sealing element and a second sealing element, and
the first sealing element is arranged around an outer peripheral surface of the support ring, and the second sealing element is fitted with the first sealing element so that the sealing device seals the recesses to form the hydraulic chambers.

3. The hydraulic composite bushing according to claim 2, wherein the first sealing element is formed with the rubber member and the support rings into one piece through vulcanization, and a first rubber layer is arranged between engaging surfaces of the first and second sealing elements.

4. The hydraulic composite bushing according to claim 2, wherein the first sealing element is configured to have a cylindrical shape, and two stepped holes are symmetrically arranged on a side wall of the first sealing element for receiving the second sealing element therein, the first rubber layer being arranged on a stepped face of each of the stepped holes.

5. The hydraulic composite bushing according to claim 1, wherein the core shaft is configured as a stepped shaft with a central projection portion, and the rubber member is formed on the outer peripheral surface of the core shaft by vulcanization of rubber; and
a diameter of the central projection portion is initially decreased and then increased along a direction from each axial end to its middle region of the central projection portion, and the rubber member is formed on an outer peripheral surface of the central projection portion in a manner of conforming to an outer peripheral contour of the central projection portion.

6. The hydraulic composite bushing according to claim 5, wherein an inner wall of each support ring is configured to conform to the outer peripheral contour of the central projection portion.

7. The hydraulic composite bushing according to claim 1, wherein a first through hole and a second through hole are respectively formed in a side wall region of the outer casing and that of a second sealing element corresponding to the hydraulic chambers, and
the first through hole is in communication with the second through hole to form a liquid injection port in communication with the hydraulic chamber, for injecting the hydraulic fluid into the hydraulic chamber.

8. The hydraulic composite bushing according to claim 7, wherein the liquid injection port is sealed with a high-pressure ball plug.

9. The hydraulic composite bushing according to claim 1, wherein the flow channel is arranged in only one of said two support rings.

10. The hydraulic composite bushing according to claim 9, wherein each of the second sub flow channels comprises a first part extending in an axial direction, and a second part communicating with the first part and extending in a radial direction, the first part communicating with a corresponding hydraulic chamber, and the second part communicating with the first sub flow channel.

11. A method for forming a flow channel in the hydraulic composite bushing according to claim 1, comprising steps of:
forming the first sub flow channel in an outer peripheral surface of one of the support rings through grooving, wherein the first sub flow channel extends along the circumferential direction so that two ends thereof correspond to respective hydraulic chambers in the circumferential direction;
forming the second sub flow channel in the support ring;
vulcanizing said support ring and the rubber member into one piece, and mounting the sealing gasket on an outer side of the first sub flow channel; and
press-fitting the outer casing on said support ring from a radially outer side thereof through interference fit, so that the sealing gasket forms a press-fit seal on the first sub flow channel to form the flow channel in said support ring.

* * * * *